United States Patent
Jiang-Hafner (12)

(10) Patent No.: US 6,400,585 B2
(45) Date of Patent: Jun. 4, 2002

(54) METHOD AND CONTROL SYSTEM FOR VOLTAGE CONTROL AT A CONVERTER STATION

(75) Inventor: Ying Jiang-Hafner, Ludvika (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/871,893

(22) Filed: Jun. 4, 2001

(30) Foreign Application Priority Data

Feb. 6, 2000 (EP) ............................................. 00201949

(51) Int. Cl.⁷ ................................................. H02J 3/36
(52) U.S. Cl. ...................................................... 363/35
(58) Field of Search ........................... 363/35; 323/207; 307/82

(56) References Cited

U.S. PATENT DOCUMENTS

| | | | | |
|---|---|---|---|---|
| 4,638,415 A | * | 1/1987 | Neupauer | 307/82 |
| 4,648,018 A | * | 3/1987 | Neupauer | 363/35 |
| 4,733,340 A | * | 3/1988 | Mase et al. | 322/58 |
| 4,941,079 A | * | 7/1990 | Ooi | 363/132 |

OTHER PUBLICATIONS

U.S. application No. 09/784,440, filed Feb. 23, 2001, pending.
U.S. application No. 09/871,893, filed Jun. 4, 2001, pending.

* cited by examiner

*Primary Examiner*—Shawn Riley
(74) *Attorney, Agent, or Firm*—Oblon, Spivak, McClelland, Maier & Neustadt, P.C.

(57) ABSTRACT

A converter station (STN1, STN2) having a voltage source converter (CON1, CON2) is coupled between a direct current link (W1, W2) and an alternating current network (N1, N2) in a high voltage direct current transmission system. A control system (CTRL1, CTRL2) for the converter station has means for control of active power flow (P) between the direct current link and the alternating current network by influencing the phase displacement ($\gamma$) between a bus voltage (UL1, UL2, UL) in the alternating current network and a bridge voltage (UV1, UV2, UV) of the voltage source converter. The control system comprises detection means (48) for generation of a phase change order signal (PCO) in response to an indication of an abnormal voltage condition at the direct current link, and means (49) for influencing the phase position of the bridge voltage in response to said phase change order signal, so as to ensure that the phase displacement between the bridge voltage and the bus voltage will result in an active power flow from the direct current link to the alternating current network.

24 Claims, 6 Drawing Sheets

METHOD AND CONTROL SYSTEM FOR VOLTAGE CONTROL AT A CONVERTER STATION

CROSS REFERENCE TO RELATED APPLICATIONS

This application claims priority under 35 U.S.C. §119 to European Patent Application No. 00201949.5-2207-, filed Jun. 2, 2000, the entire contents of which are incorporated herein by reference.

TECHNICAL FIELD

The invention relates to a method for control of a converter station having a voltage source converter coupled between a direct current link and an alternating current network in a high voltage direct current transmission system, the control system having means for control of active power flow between the direct current link and the alternating current network by influencing the phase displacement between a bus voltage in the alternating current network and a bridge voltage of the voltage source converter, and to a control system for carrying out the method.

BACKGROUND ART

For a general description of controls systems for voltage source converters reference is made to Anders Lindberg: PWM and Control of Two and Three Level High Power Voltage Source Converters. Royal Institute of Technology, Department of Electric Power Engineering. Stockholm 1995, in particular pages 1, 77–106, and appendix A.

The block diagrams to be described in the following can be regarded both as signal flow diagrams and block diagrams of control equipment for the transmission system. The functions to be performed by the blocks shown in the block diagrams may in applicable parts be implemented by means of analogue and/or digital technique in hard-wired circuits, but preferably as programs in a microprocessor. It shall also be understood that although the in the figures shown blocks are mentioned as members, filters, devices etc. they are, in particular where their functions are implemented as software for a microprocessor, to be interpreted as means for accomplishing the desired function. Thus, as the case may be, the expression "signal" can also be interpreted as a value generated by a computer program and appearing only as such. Only functional descriptions of the blocks are given below as these functions can be implemented in manners known per se by persons skilled in the art.

In order not to weigh the description with for the person skilled in the art obvious distinctions, usually the same designations are used for quantities that appear in the high voltage transmission system and for those measured values and signals/calculated values corresponding to these quantities that are supplied to and processed in the control equipment and control system described below.

Parts that are similar to each other and appear in more than one figure are given the same designation numbers in the various figures.

Connecting lines between sensed values and blocks have occasionally been omitted in order not to unnecessary weigh the figures. However, it is to be understood that the respective variables appearing at the inputs of some blocks are supplied from the sensed values respectively from the blocks where they are generated.

FIG. 1 shows in the form of a schematic single line and block diagram a high voltage direct current transmission system as known in the prior art. A first and a second converter station STN1 and STN2 respectively, are coupled to each other via a direct current link having two pole conductors W1 and W2 respectively. Typically, the pole conductors are cables but they may also at least to a part be in the form of overhead lines. Each converter station has a capacitor equipment, C1 and C2, respectively, coupled between the pole conductors, and comprises a voltage source converter CON1 and CON2, respectively. Each converter comprises two three-phase groups of semiconductor valves in six-pulse bridge connection. The semiconductor valves comprise, in a way known per se, branches of gate turn on/turn off semiconductor elements, for example power transistors of so-called IGBT-type, and diodes in anti-parallel connection with these elements.

Each converter is via a phase inductor PI1 and PI2, respectively, coupled to a respective three-phase alternating current electric power network N1 and N2. Although not shown in the figure, it is well known in the art that the converters may be coupled to the three-phase network via transformers, in which case the phase inductors in some cases may be omitted. Filter equipment F1 and F2, respectively, are coupled in shunt connection at connection points between the phase inductors and the three-phase networks.

The ac-voltage of the alternating current network N1 at the connection point of the filter F1 is designated UL1 and is sensed with a sensing device M1. This voltage is in the following called the bus voltage of the alternating current network N1. The ac-voltage set up by the converter CON1 is designated UV1 and is in the following called the bridge voltage of the converter CON1. The alternating current at the converter CON1 is designated IV1 and is sensed with a measuring device M3. Similarly the ac-voltage at the connection point of the filter F2 is designated UL2 and is sensed with a sensing device M4, and the alternating current at the converter CON2 is designated IV2 and is sensed with a measuring device M6. The ac-voltage at the connection point of the filter F2 is in the following called the bus voltage of the alternating current network N2. The ac-voltage set up by the converter CON2 is designated UV2 and is in the following called the bridge voltage of the converter CON2.

The dc-voltage across the capacitor equipment C1 is designated Ud1 and is sensed with an only symbolically shown sensing device M7. The voltage across the capacitor equipment C2 is designated Ud2 and is sensed with an only symbolically shown sensing device M8.

The first converter station comprises control equipment CTRL1 and the second converter station control equipment CTRL2, usually of similar kind as the control equipment CTRL1.

The converter stations can operate in four different modes, one of dc-voltage control and active power control and one of ac-voltage control and reactive power control. Usually, one of the converter stations, for example the first one, operates under dc-voltage control for voltage control of the direct current link, whereas the second converter station operates under active power control and under ac-voltage or reactive power control. The operation modes are set either manually by an operator, or, under certain conditions, automatically by a not shown sequential control system.

A known embodiment of the control equipment CTRL1 is shown in FIG. 2, and illustrated for the case of operation under dc-voltage control for the purpose of voltage control of the direct current link. It comprises a dc-voltage controller UdREG, an ac-voltage controller UaREG, a selector means SW21, and a converter current control system IREG.

The dc-voltage controller is supplied with an actual value of the sensed dc-voltage Ud1 across the capacitor equipment C1 and a voltage reference value Ud1R thereof and forms in dependence on the deviation of the actual value and the reference value an output signal p1R.

The ac-voltage controller is supplied with an actual value of the sensed bus voltage UL1 and a voltage reference value UL1R thereof and forms in dependence on the deviation of the actual value and the reference value an output signal DUL1.

The output signal DUL1 and a reference value Q1R for the reactive power flow through the converter CON1 are supplied to two different inputs on the selector means SW21.

In dependence on a mode signal MD21 either of the output signal DUL1 and the reference value Q1R is transferred and supplied to the converter current control system IREG in the form of a signal designated q1R.

An embodiment of the control equipment CTRL2 as described in the European Patent Application No. 99112542.8 (to be published) is shown in FIG. 3, and illustrated for the case of operation under active power control and reactive power control.

The control equipment CTRL2 comprises a dc-voltage controller UdREG, a calculating member PCALC, an active power controller PREG, an adder SUM, an ac-voltage controller UaREG, a selector means SW22, and a converter current control system IREG, of the same kind as the converter current control system comprised in control equipment CTRL1.

The dc-voltage controller is supplied with an actual value of the sensed dc-voltage Ud2 across the capacitor equipment C2 and a voltage reference value Ud2R thereof and forms in dependence on the deviation of the actual value and the reference value an output signal p2R.

The ac-voltage controller is supplied with an actual value of the sensed bus voltage UL2 and a voltage reference value UL2R thereof and forms in dependence on the deviation of the actual value and the reference value an output signal DUL2.

The output signal DUL2 and a reference value Q2R for the reactive power flow through the converter CON2 are supplied to two different inputs on the selector means SW22.

In dependence on a mode signal MD22 either the output signal DUL2 or the reference value Q2R, in the case illustrated the reference value Q2R, is transferred and supplied to the converter current control system IREG in the form of a signal designated q2R.

The voltage reference value Ud2R is formed in dependence on a voltage reference value Ud2R' and a voltage reference correction signal ΔUdR, the forming of which will be explained below. The voltage reference, value Ud2R' can preferably be chosen equal to the voltage reference value Ud1R for the dc-voltage Ud1 across the capacitor equipment C1 at the first converter station.

The active power controller PREG has as inputs a quantity P2 indicative of the actual value of the active power flow through the second converter station and a reference value P2R thereof, and outputs in dependence of a deviation between these inputs the voltage reference correction signal ΔUdR. The voltage reference correction signal and the voltage reference value Ud2R' are supplied to the adder SUM, which forms the voltage reference value Ud2R as the sum of its inputs.

The active power controller comprises in a conventional way a (not shown) controller member, having for example a proportional/integrating characteristic, thus providing feedback control of the active power flow through the second converter station by way of adjusting the dc-voltage of the second converter station to a value that results in the desired active power flow through the converter. The quantity P2 indicative of the actual value of the active power flow through the second converter station, is calculated in a calculating member PCALC in dependence on sensed values of the bus voltage UL2 and the alternating current IV2 flowing through the converter.

The output signals p1R and p2R of the dc-voltage controllers of the control equipment CTRL1 and CTRL2, respectively, have the significance of an active power order, and the output signals q1R and q2R of the selector means SW21 and SW22, respectively, have the significance of a reactive power order for the respective converter stations. These output signals are supplied to the converter current control systems IREG of the respective control equipment.

The converter current control system IREG is introduced in the purpose to linearise the control of active and of reactive power.

Preferably, the converter current control system is implemented as software run on a microprocessor and executed as a sampled control system. For practical reasons, that is for facilitating the calculations to be described in more detail below, the converter current control system operates in a conventional way with three phase units (voltages and currents of the alternating current network) converted to and expressed in a rotating two-phase dq-reference plane, arrived at via a transformation to a stationary two-phase αβ-reference plane. The three phase units of the alternating current network will then be transformed to direct current quantities that can be processed with per se known control system techniques.

Vector units are in the following illustrated with a dash on top ($\bar{x}$). With the phases of the three-phase alternating current network designated a, b and c, the three-phase system is referred to as the abc-system. In the following text and in the figures the reference plane is, where appropriate, indicated as an upper index (for example $\bar{x}^{dq}$).

The transformation of currents and voltages expressed in the abc-reference plane to the dq-reference plane is treated in detail in appendix A of the above mentioned reference Anders Lindberg: PWM and Control of Two and Three Level High Power Voltage Source Converters, but a brief summary will be given here.

A set of three phase quantities of the three-phase abc-system, for example voltages or currents, generally designated $x_a$, $x_b$, $x_c$ respectively, are in the αβ-reference plane represented by a space vector $\bar{x}^{\alpha\beta}$, which is arrived at by a transformation defined as $$\bar{x}^{\alpha\beta} = x_\alpha + jx_\beta = \frac{2}{3}(x_a * e^{j0} + x_b * e^{j2\pi/3} + x_c * e^{-j2\pi/3}) \quad (1)$$

With ω designating the angular frequency of the three-phase alternating current network, and with $x_a = \hat{x}\cos(\omega t - \phi)$, $x_b = \hat{x}\cos(\omega t - \phi - 2\pi/3)$, and $x_c = \hat{x}\cos(\omega t - \phi - 4\pi/3)$, the space vector $\bar{x}^{\alpha\beta}$ becomes $$\bar{x}^{\alpha\beta} = \hat{x} e^{j(\omega t - \phi)} \quad (2)$$

which is a vector having the length $\hat{x}$ rotating with the angular frequency ω in the stationary αβ-reference plane.

A transformation of the space vector $\bar{x}^{\alpha\beta}$ to a vector $\bar{x}^{dq}$ in the dq-reference plane is formally expressed as $$\bar{x}^{dq} = x_d + jx_q = \bar{x}^{\alpha\beta} * e^{-j\xi} \quad (3)$$

The direction of the d-axis is defined as the direction of a vector in the αβ-reference plane being the transformation of a symmetrical three-phase quantity with the phase displacement φ=0. With ξ=ωt the expressions (2)–(3) result in $$\bar{x}^{dq} = \hat{x} e^{j(\omega t - \phi)} * e^{-j\omega t} = \hat{x} e^{-j\phi} \quad (4)$$

which expression represents a vector that in steady state is stationary in the rotating dq-reference plane, having the phase position φ related to the direction of the d-axis. Thus the vector $\bar{x}^{dq}$ can be seen as direct current quantity.

The basic structure of a converter current control system is illustrated in FIG. 4. For the sake of simplicity, all variables are shown in vector form, but it is understood that the signal processing thereof is performed on the components of the respective vector in ways known per see. As the current control systems are similar for both pieces of control equipment, indices 1 and 2 are, for the sake of simplicity, omitted as indices on the respective variables to be described below.

As explained with reference to FIGS. 2–3, the converter current control system receives a signal pR, generated by a super-ordinated controller for dc-voltage control, and a signal qR, generated by a super-ordinated controller for ac-voltage control and for reactive power control, respectively, and generates and outputs in dependence thereon a train Fp of turn on/turn off orders to the semiconductor valves according to a predetermined pulse width modulation pattern.

The converter current control system comprises a current-order calculating unit 41, a current controller 42, transformation members 43 and 44, a phase locked loop (PLL) member 46, and an adder 47.

The output signals p1R and q1R from the respective super-ordinated controllers are supplied to the current-order calculating unit 41, which in dependence thereon calculates and outputs reference values for the alternating current at the converter. The reference values are expressed in the dq-reference plane as $IV_R^d$ and $IV_R^q$ respective, and in the figure shown as a current reference vector $\overline{IV}_R^{dq} = IV_R^d + jIV_R^q$. The calculation is performed according to the per se known relations $$p_R = UL^d IV_R^d + UL^q IV_R^q$$
$$q_R = UL^d IV_R^q - UL^q IV_R^d \quad (5)$$

wherein the voltages $UL^d$ and $UL^q$ represent d- and q-components respectively, of the bus voltage UL sensed in the alternating current network and transformed to the dq-reference plane in a manner known per se, for example as described in the above mentioned reference Anders Lindberg: PWM and Control of Two and Three Level High Power Voltage Source Converters, pages 80–84, which are hereby incorporated by reference.

The current reference values $IV_R^d$ and $IV_R^q$ may be limited in accordance with specified operating conditions for the transmission system before further processing but such limitation means, which may be implemented in per se known ways, are not treated in this a context.

It is noted that in a dq-reference plane rotating in synchronism with the bus voltage, the q-component of the bus voltage becomes zero. It then follows from expression (5) that the d-component of the current reference value becomes a reference value for active power and the q-component a reference value for reactive power.

The current controller 42 comprises a difference forming member 421 (a circle at the input of the adder symbol indicates that the input signal is added with inverted sign), a control member 422, and an adder 423. The difference forming member 421 is supplied with and forms as its output the difference between the current reference vector $\overline{IV}_R^{dq}$ and the actual value of the alternating current IV, sensed in the alternating current network at the converter and transformed to the dq-reference plane as a current vector $\overline{IV}^{dq}$ (the transformation not shown in the figure). The mentioned difference is supplied to the control member 422, which has a per se known proportional-integral characteristic.

The output signal of the control member is supplied to the adder 423. This adder is also supplied with the current reference vector $\overline{IV}_R^{dq}$, multiplied in a block 433 with a constant factor $K_L$ having the dimension of an impedance and a value determined by data at the converter station, as will be explained in more detail below, and a mean value $\overline{UL}_m^{dq}$ of the bus voltage UL transformed to the dq-reference plane. The generation of the mean value $\overline{UL}_m^{dq}$ will be further described below. The output signal of the adder 423, designated $\overline{UV}_R^{dq}$, which is the sum of the signals supplied to it, is, as will be further described below, an alternating voltage reference vector for the bridge voltage of converter in the dq-reference plane.

The current controller 42 thus comprises one branch with a feed back control of the it alternating current at the converter, one branch with a feed forward control in dependence of the reference value of the alternating current at the converter, and one branch with a feed forward of the mean value of the bus voltage UL.

The alternating voltage reference vector $\overline{UV}_R^{dq}$ is supplied to a transformation member 43, transforming the vector to the αβ-reference plane. The output of the transformation member 43 is supplied to a transformation member 44, transforming its input vector to the abc-reference plane as a vector $\overline{UV}_R^{abc}$. This vector is the bridge voltage reference vector for the converter, having as components voltages reference values for the respective three phases of the alternating current system.

The voltage reference vector $\overline{UV}_R^{abc}$ is supplied to a pulse-generating unit 45, which, in a way known per se and according to a predetermined PWM (Pulse Width Modulation) pattern, in dependence thereon generates the train Fp of turn on/turn off orders supplied to the semiconductor valves.

The phase locked loop (PLL) member 46 generates, in a way known per se, in dependence on sensed values of the angular frequency ω of the alternating current network and of the phase position of the bus voltage UL, transformed to the αβ-reference plane, a synchronising signal ξ. The synchronising signal ξ represents the transformation angle fused in the above described transformation between the αβ-reference plane and the dq-reference plane according to the expression (3) above, and has the purpose of synchronising the rotating dq-reference plane with the bus voltage abc-system. Thus, the synchronising signal ξ is an angle linearly increasing with time with a time rate proportional to the frequency of the alternating current network. At least under steady state conditions, the synchronising signal ξ is locked to and in synchronism with the phase position of the bus voltage of the alternating current network. When the synchronising signal is in synchronism with the phase position of the bus voltage also the rotating dq-reference plane is locked to and maintained in synchronism with the three-phase abc-system and in particular with the bus voltage. Under these conditions, also the q-component of the bus voltage becomes zero.

An adder 47 is supplied with the synchronising signal ξ and a delay angle Δξ, and outputs and supplies to the transformation member 43 the sum ξ'=ξ+Δξ thereof. The transformation member 43 thus performs the transformation from the dq-reference plane to the αβ-reference plane according to the expression (3) above using the transformation angle ξ' and not the transformation angle ξ generated by the phase locked loop member 46. The delay angle Δξ is added due to stability reasons of the current control system and will be explained in more detail below.

The current control system will now be described into some more detail.

The relationship between the alternating converter current $\overline{IV}^{dq}$, the bridge voltage $\overline{UV}^{dq}$, and the bus voltage $\overline{UL}^{dq}$, can be expressed as $$\overline{UV}^{dq} = \overline{UL}^{dq} - j\omega L\overline{IV}^{dq} - L\frac{d}{dt}(\overline{IV}^{dq}) \quad (6)$$

where L is the phase inductance between the two locations in the network where the two voltages appear, in the transmission system described the inductance of the phase inductor PI1 respectively the phase inductor PI2. The resistance of the circuit is neglected, an approximation that is usually valid in high power circuits.

The current control system is implemented as a sampled control system with a sample period Ts, and a per see known control law giving a dead-beat control of the converter current will now be described. The control law is obtained by integration of the expression (6) and will according to the dead-beat condition give the principal result that $\overline{IV}(k+1)=\overline{IV}_R(k)$, that is, the actual current value is equal to its reference value one sample period earlier.

Integration of the expression (6) over one sample period yields the result $$\overline{UV}_R^{dq}(k) = \overline{UL}_m^{dq}(k) - j\omega L\overline{IV}_m^{dq}(k) - \frac{L}{Ts}\left[\overline{IV}_R^{dq}(k) - \overline{IV}^{dq}(k)\right] \quad (7)$$

where the lower index "m" indicates the mean value over the sample period.

It can be demonstrated that in taking into consideration low pass filtered values of the positive and the negative sequence components, designated $\overline{UL}_{p,f}^{dq}$ and $\overline{UL}_{n,f}^{dq}$ respectively, of the bus voltage, a predicted mean value of the bus voltage during the sample period can be calculated as $$\overline{UL}_m^{dq}(k)=\overline{UL}_{p,f}^{dq}(k)+\overline{UL}_{n,f}^{dq}(k)e^{-j2\omega Ts/:} \quad (8)$$

where $$\overline{UL}_{n,f}^{dq}=\overline{UL}_{n,f}^{d'q'}e^{-j2\xi} \quad (9)$$

Here the d'q'-reference plane is a plane rotating clockwise in relation to the dq-reference plane making the negative sequence component of the bus voltage stationary in the d'q'-plane.

With a dead-beat control of the current, an approximate value of the mean value of the converter current during the sample period is obtained from the expression $$\overline{IV}_m^{dq}(k) = \frac{1}{2}\left[\overline{IV}_R^{dq}(k) + \overline{IV}_R^{dq}(k-1)\right] \quad (10)$$

Before applying the reference value of the converter bridge voltage to the PWM pulse-generating unit 45, it has to be transformed back to the αβ-reference plane. In this transformation an additional angle equal to ωTs/2 has to be added to the transformation angle ξ to take into consideration the sample-and-hold property of the sampled control system. Thus $$\overline{UV}_R^{\alpha\beta}(k)=\overline{UV}_R^{dq}(k)e^{j[\xi(k)-\omega Ts/2]} \quad (11)$$

The expression (7) above indicates a control law of feed forward character. In order to reduce the converter current deviation to zero in steady state, the feed back control loop is introduced, comprising the control member 422 supplied with the converter current deviation.

The output $\Delta\overline{U}_{PI}^{dq}$ of the controller can be written as $$\Delta\overline{U}_{PI}^{dq}(k) = \frac{1}{Ts}H_{PI}\left[\overline{IV}_R^{dq}(k-1) - \overline{IV}^{dq}(k)\right] \quad (12)$$

were $H_{PI}$ is the transfer function, that is expressing the proportional-integral characteristic, of the controller.

The expression (7) supplemented with the expression (12) thus becomes $$\overline{UV}_R^{dq}(k) = \overline{UL}_m^{dq}(k) - j\omega L\overline{IV}_m^{dq}(k) - \frac{L}{Ts}\left[\overline{IV}_R^{dq}(k) - \overline{IV}_R^{dq}(k-1)\right] - \Delta\overline{U}_{PI}^{dq}(k) \quad (13)$$

and in which expression the relation $\overline{IV}^{dq}(k)=\overline{IV}_R^{dq}(k-1)$ is used.

However, with the control system implemented in a digital signal processor one extra sample period will be required to allow for time needed for calculations to be performed, having as consequence that $\overline{IV}(k+1)=\overline{IV}_R(k-1)$.

In the expression (8), the transformation of the negative sequence component has to be modified due to the extra time delay, and becomes $$\overline{UL}_m^{dq}(k-1)=\overline{UL}_{p,f}^{dq}(k-1)+\overline{UL}_{n,f}^{dq}(k-1)e^{-j\omega 3Ts/2} \quad (15)$$

Similarly, the expression (12) has to be modified and becomes $$\Delta\overline{U}_{PI}^{dq}(k-1) = \frac{1}{Ts}H_{PI}\left[\overline{IV}_R^{dq}(k-3) - \overline{IV}^{dq}(k-1)\right] \quad (16)$$

Similarly, expression (11) is modified, due to the extra time delay, to $$\overline{UV}_R^{\alpha\beta}(k)=\overline{UV}_R^{dq}(k)e^{j[\xi(k-1)+\omega 3Ts/2]} \quad (16)$$

The significance of expression (16) is that a delay angle Δξ=ω3Ts/2 has to be added to the transformation angle ξ by the phase locked loop member 46 (not shown in FIG. 5) to compensate for the time delays in the converter current control system.

An implementation of the control scheme is illustrated in FIG. 5, where the blocks having an indicated transfer function $z^{-1}$ indicates a delay of one sample period. A comparison with the expression (13) above shows that the adder 423 corresponds to the equal-sign in the expression. A delay member 424, an adder 428, and a multiplying member 429 correspond to the second term of the expression, where expression (12) is used. The delay member 424, a difference forming member 425, and a multiplying member 426 correspond to the third term of the expression.

A comparison with the expression (15) above shows that the delay member 424, a delay member 427, the difference forming member 421, the control member 422, and a multiplying member 432 correspond to this expression and to the fourth term in expression (13). An adder 430 is introduced for the purpose only of adding the second and third terms of expression (13), the feed forward terms of the current reference value, before supplying the sum thereof to the adder 423.

The figure also shows a transformation member 431 for the transformation of the inverter current vector $\overline{IV}^{\alpha\beta}$ expressed in the αβ-reference plane to the dq-reference plane.

Thus, during normal operation of the direct current transmissions system, the voltage of the direct current link is controlled at a desired value by one of the converter stations. However, it has to be taken into account that disturbances may occur in the transmission system that create abnormal voltage conditions at the direct current link. In particular, such disturbances may cause the dc-voltage to rapidly increase to a level that would exceed safe operation limits of various parts of the transmission system, such as for example the valves of the converters. For this reason, the converter stations are equipped with over voltage protection systems that will block or even shut down the station in dependence on an indication that the dc-voltage has reached a too high level. However, a blocking or a shut down of the station will have negative consequences, such as loss of power. A shut down will also require a restart of the converter station, and possibly the whole transmission system, which is a time consuming procedure.

Thus, to avoid an unacceptable frequency of interruptions in the power transmission system, it is common practice to introduce short-circuiting devices, so called chopper circuits, coupled between the pole conductors, to rapidly reduce the voltage of the direct current link when needed. This is illustrated in FIG. 1, where the first converter station has a first chopper circuit CH1, and the second converter station has a second chopper circuit CH2, each coupled between the pole conductors. Each of the chopper circuits comprises a switch and a resistor connected in series with the switch. The switch is symbolically shown as a mechanical contact but is preferably implemented as a fast controllable semiconductor valve, for example having branches of power transistors of similar kind as are used in the converter valves. The switches are closed in dependence on switching orders SC1 and SC2, respectively, generated by voltage comparing devices UCH1 and UCH2, respectively. The voltage comparing devices are supplied with the dc-voltage sensed across the respective capacitor equipment. In response to that voltage reaching a higher limit value, the respective switch is closed and the capacitor equipment discharges its energy through the resistor, thereby reducing the voltage of the direct current link. The voltage comparing devices have a hysteresis characteristic such that when the voltage has reached a lower limit value, that is lower than the higher limit value, the switch is reset to a nonconducting state. Thus, in the case of temporary disturbances, it is possible to maintain the operation of the converter stations within safe operating limits until the disturbance is cleared, without blocking and shut down of the station.

However, chopper circuits as describe above, having components that have to be designed for the full voltage of the transmission system, are costly and require space at the converter stations.

SUMMARY OF THE INVENTION

It is an object of the invention to provide a method of the kind described in the introduction, which permits maintenance of the voltage of the direct current link within safe operating limits also at abnormal voltage conditions at the direct current link, which method is simple and satisfactory from a technical and economic point of view, and a control system for carrying out the method.

According to the invention, this is achieved by the control system comprising detection means for generation of a phase change order signal in response to an indication of an abnormal voltage condition at the direct current link, and means for influencing the phase position of the bridge voltage in dependence on said phase change order signal so as to ensure that the phase displacement between the bridge voltage and the bus voltage will result in an active power flow from the direct current link to the alternating current network.

According to an advantageous development of the invention, said means for influencing the phase position of the bridge voltage comprises means for adding a fixed phase contribution to the phase position of the bridge voltage.

According to another advantageous development of the invention, said detection means comprises means for receiving a sensed value of the voltage of the direct current link, and means for generating said phase change order signal when the amplitude of said sensed value exceeds a first limit value and the rate of change with respect to time of said sensed value exceeds a second limit value.

According to another advantageous development of the invention, the control system further comprises detection means for generation of the phase change order signal in response to an indication that the bridge voltage has lost its synchronism with the bus voltage.

According to another advantageous development of the invention, said detection means comprises means for receiving a reference value for the active power component of the alternating current at the converter and a sensed value representative of the active power component of the alternating current at the converter, and means for generating said phase change order signal when a difference of said sensed value representative of the active power component of the alternating current at the converter and the reference value exceeds a third limit value.

Further advantageous developments and embodiments of the invention will become clear from the following description and from the claims attached thereto.

With the invention, the voltage at the direct current link can be maintained within safe operating limits also at abnormal voltage conditions at the direct current link, without the use of a chopper circuit for this purpose.

BRIEF DESCRIPTION OF THE DRAWINGS

The invention will be explained in greater detail by description of embodiments with reference to the accompanying drawings, which are all schematic and in the form of single line diagrams and block diagrams respectively, and wherein.

DESCRIPTION OF THE PREFERRED EMBODIMENTS.

The following description relates both to the method and to the high voltage direct current transmission system.

The invention will be explained in further detail with reference to the converter current control system described above with reference to FIG. 5.

It is well known that active power flow is controlled via the phase displacement γ between bus voltage UL and the bridge voltage UV. With a commonly used reference system, the active power P can be expressed as $$P = -\sin\gamma \frac{UL * UV}{X} \quad (17)$$

wherein γ=arg(UL)−arg(UP), X is the impedance of the respective phase inductor, and the reference direction of P is such that P is positive when power flows from the direct current link to the alternating current network.

Thus, by making the bridge voltage UV leading the bus voltage UL in, phase, that is making γ<0, active power will flow from the direct current link through the converter to the alternating current network.

According to the invention, a phase change order signal is generated in response to an indication of an abnormal voltage condition at the direct current link, and in response to said phase change order signal, the phase position of the bridge voltage is influenced so as to ensure that the phase displacement between the bridge voltage and the bus voltage will result in an active power flow from the direct current link to the alternating current network. Then, the capacitor equipment will discharge its energy through the converter, and thereby reduce the voltage of the direct current link.

Figure 5:
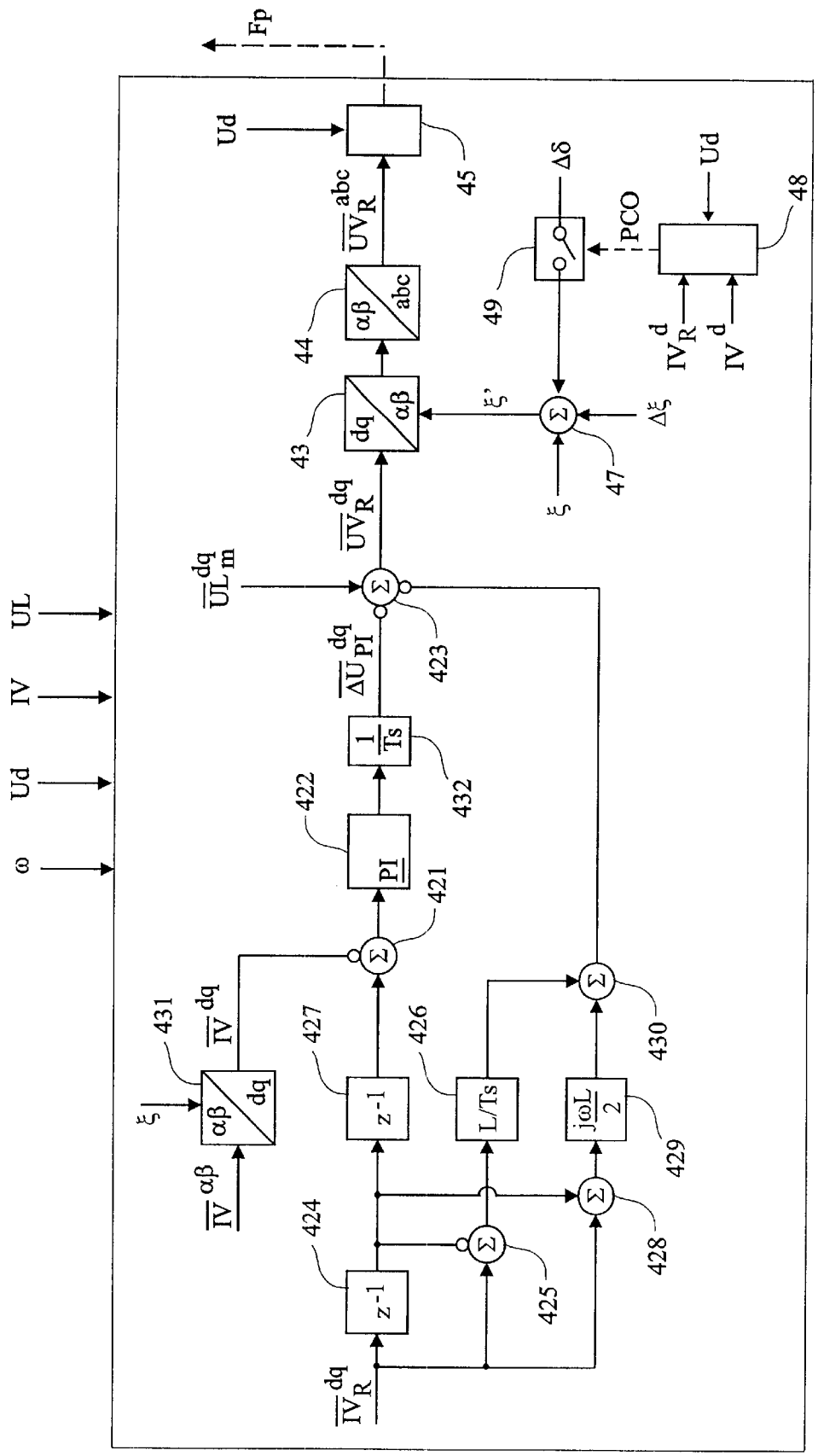
FIG. 5 shows an embodiment of the invention with a converter current control system according to FIG. 4, shown in more detail.

In a preferred embodiment of the invention, as illustrated in FIG. 5, the phase position of the bridge voltage is influenced by adding at the adder 47 a fixed phase contribution Δδ to the signal ξ'=ξ+Δξ, that is to the sum of the synchronising signal ξ and the delay angle Δξ described above and known in the prior art.

A criteria unit 48 generates, in dependence on an evaluation of received inputs and according to a given criterion, a phase change order signal PCO. As is symbolically illustrated in the figure, the phase change order accomplishes the supply of the fixed phase contribution Δδ to the adder 47 by closing a switching means 49.

With the phase contribution Δδ added at the adder 47, the transformation member 43 thus performs the transformation of the bridge voltage reference vector $\overline{UV}_R^{dq}$ from the dq-reference plane to the αβ-reference plane using a transformation angle ξ'=ξ+Δξ+Δδ. The fixed phase contribution will have the effect of a fixed phase displacement of the rotating dq-reference plane in addition to its rotation with the angular frequency given by the expression ξ=ωt. Thus, the effect will be that via the transformation from the rotating dq-reference plane to the stationary αβ-reference plane, the phase position of the converter bridge voltage is changed with a corresponding phase displacement.

Figure 6:
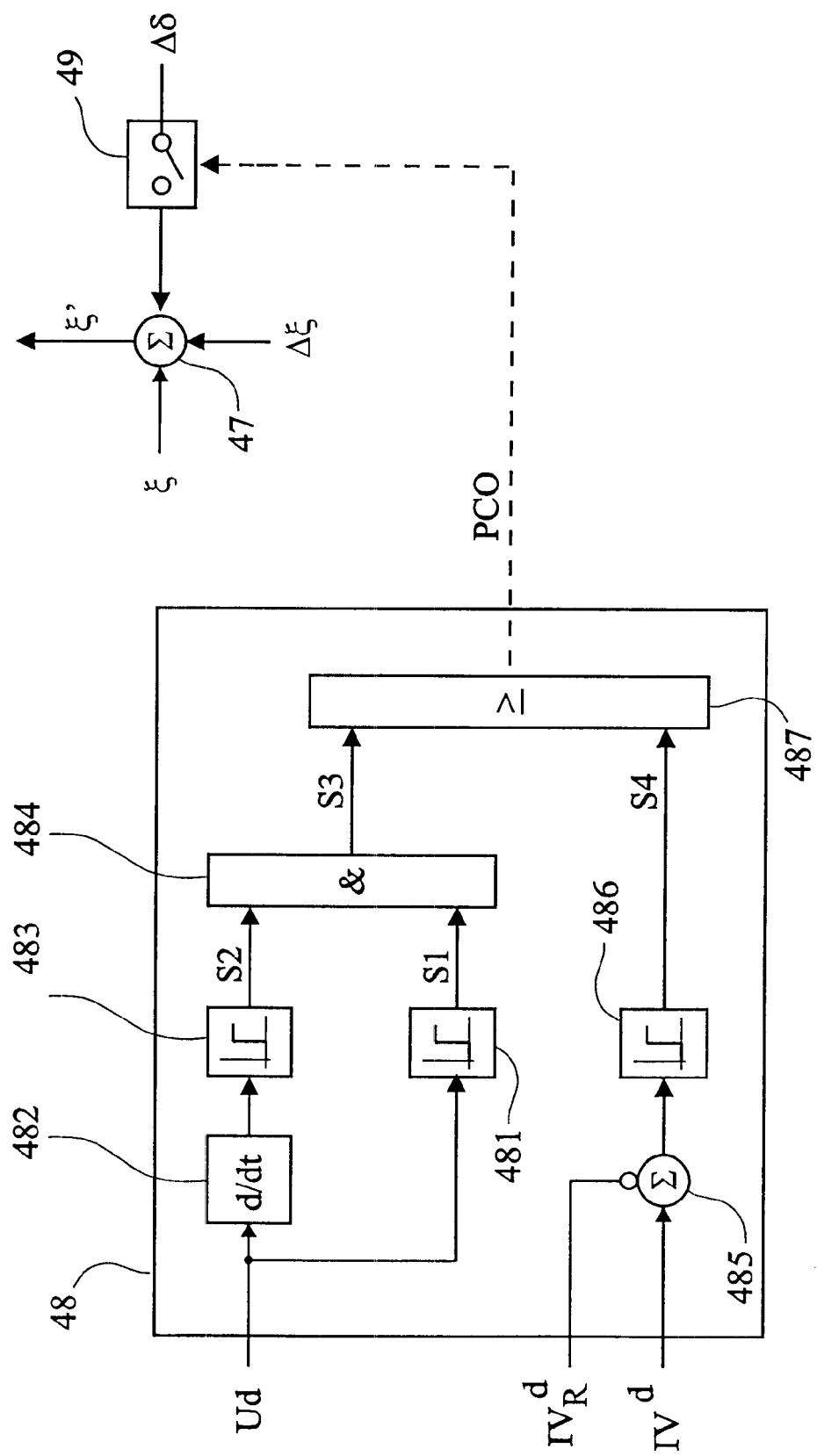
FIG. 6 shows a criteria unit for generation of a phase change order signal according to the invention.

A preferred embodiment of the criteria unit is shown in FIG. 6. The unit comprises comparators 481 and 483, a time-derivating member 482, a logic AND-member 484, and a logic OR-member 487.

A first situation that will cause an abnormal voltage condition, that is an uncontrolled and rapidly increasing voltage, at the direct current link, is that the converter operating as inverter, i.e. is transmitting active power from the direct current link to the alternating current network to which it is connected, is suddenly blocked, for example due to a disturbance in the alternating current network that triggers an over current protection device, or to a component failure in the converter station. Initially, the converter operating as rectifier will then continue to deliver active power to the direct current link, thereby charging the capacitor equipment and, as a consequence thereof, increasing the voltage of the direct current link, which voltage might reach a dangerous value in very short time, typically in the order of a few milliseconds.

An indication of such an abnormal voltage condition is obtained according to a first criterion as described below. The comparator 481 is supplied with a sensed value of the direct voltage Ud of the direct current link and generates in response to this value exceeding a first limit value a first logic signal S1 which is supplied to the logic AND-member 484. To increase the capability of the control system according to the invention to reduce the voltage of the direct current link before it reaches a level where an over voltage protection system of the converter station would block it, also the rate of change with respect to time of the direct voltage Ud is taken into consideration. This is accomplished by supplying also the time-derivating member 482 with the sensed value of the direct voltage Ud. The time-derivating member 482 determines in a way known per se a value representing the rate of change of the direct voltage Ud and generates in response to this rate of change value exceeding a second limit value a second logic signal S2 which is supplied to the logic AND-member 484. The member 484 generates in response to the presence of both the mentioned logic signals a third logic signal S3 that is supplied to the logic OR-member 487. The logic OR-member generates the phase change order signal PCO in response to the third logic signal.

A second situation that might cause an abnormal voltage condition at the direct current link is that the converter is subject to a disturbance causing a sudden phase change in its bus voltage, typically at a fault in the alternating current network. The phase locked loop member 46 that generates the synchronising signal ξ to keep the dq-reference plane in synchronism with the bus voltage will during steady state conditions and during slow and gradual phase changes of the bus voltage maintain this synchronism. However, the synchronisation is accomplished with some delay inherent of the phase locked loop member. At a sudden phase change of the bus voltage, the synchronism between the rotating dq-reference plane and the bus voltage might be lost and not regained for a period of time typically in the order of 1–2 periods of the alternating current network frequency. During such a situation the in the dq-reference plane calculated values of the inverter currents $IV^d$ and $IV^q$ maybe incorrect, that is differ from their actual values, and active and reactive power flow can then not be controlled via the converter current control system.

Typically, a lost synchronisation will result in a deviation between the inverter current $IV^d$ and its reference value $IV_R^d$ that is greater than such deviations that are due to normal changes in the reference value. When defining $IV^d>0$ as active power flow from the alternating current network to the direct current link, then if $IV^d$ exceeds its reference value $IV_R^d$ with a certain amount, this implies that more active power is fed to the direct current link than is required by the super-ordinated controller. This means that the capacitor equipment will be charged and as a consequence thereof the voltage of the direct current link will increase and might reach a dangerous value in very short time.

According to an advantageous development of the invention, an indication of such an abnormal voltage condition is obtained according to a second criterion as described below.

In this development of the invention, the criteria unit 48 comprises also a difference forming member 485 and comparator 486. The inverter current $IV^d$ and its reference value $IV_R^d$ are supplied to the difference forming member 485 which outputs the difference thereof and supplies it to the comparator 486. The comparator 486 generates in response to this difference value exceeding a third limit value a fourth logic signal S4 which is supplied to the logic OR-member 487, which generates the phase change order signal PCO in response to the fourth logic signal.

By making the criteria unit 48 responsive also to the fourth logic signal, and by proper choice of the third limit value, an improvement of the performance of the invention is obtained in that already the cause of a voltage increase at the direct current link is detected. This results in that a faster response of the control system according to the invention will be achieved for cases where the loss of synchronism would be the cause to an over voltage on the direct current link.

Obviously, the logic OR-member 487 is required only when the phase change order signal PCO is generated in response to either of the third and the fourth logic signal, and may be omitted if only the first criteria is used.

The magnitude of the fixed phase contribution $\Delta\delta$ shall be chosen so that it brings the bridge voltage leading the bus voltage in phase, notwithstanding that the dq-reference plane is not in synchronism with the bus voltage and, as a consequence thereof, the converter current cannot be properly controlled via the converter current control system. In this way, it will reverse the direction of that active power flow which is the cause behind the abnormal voltage condition at the direct current link.

As is clear from the expression (17) for the active power flow P, the magnitude of the fixed phase contribution $\Delta\delta$ shall preferably be chosen proportional to the impedance of the phase inductor and also so that ensures quickest possible discharge of the capacitor equipment without the converter current exceeding its rated value.

Studies have shown that in a particular case where the impedance of the phase inductor has a value of 0.14 per unit (the unit being defined as the square of the rated RMS-value of phase-to-phase voltage, divided by the nominal apparent power), a preferable magnitude of the fixed phase contribution is $\Delta\delta=4\omega Ts$. This magnitude is somewhat higher than a magnitude that would be allowable with respect to the current rating if the control system was without delay, but takes into account the delay of the control system.

As follows from the operating principle of the converter according to a PWM-pattern, the fixed phase contribution will be effected at the valve switching that follows next to the generation of the phase change order signal.

Typically the first limit value of the comparator 481 is chosen in the order of 1.35 of the rated value of the direct current link voltage, the second limit value of the comparator 483 is chosen in the order of 70 times the rated value of the direct current link voltage per second, and the third limit value of the comparator 486 is chosen in the order of 0.4 times the rated value of the active power component of converter current.

The invention is not limited to the embodiments described but a plurality of modifications is feasible within the scope of the claims.

Figure 3:
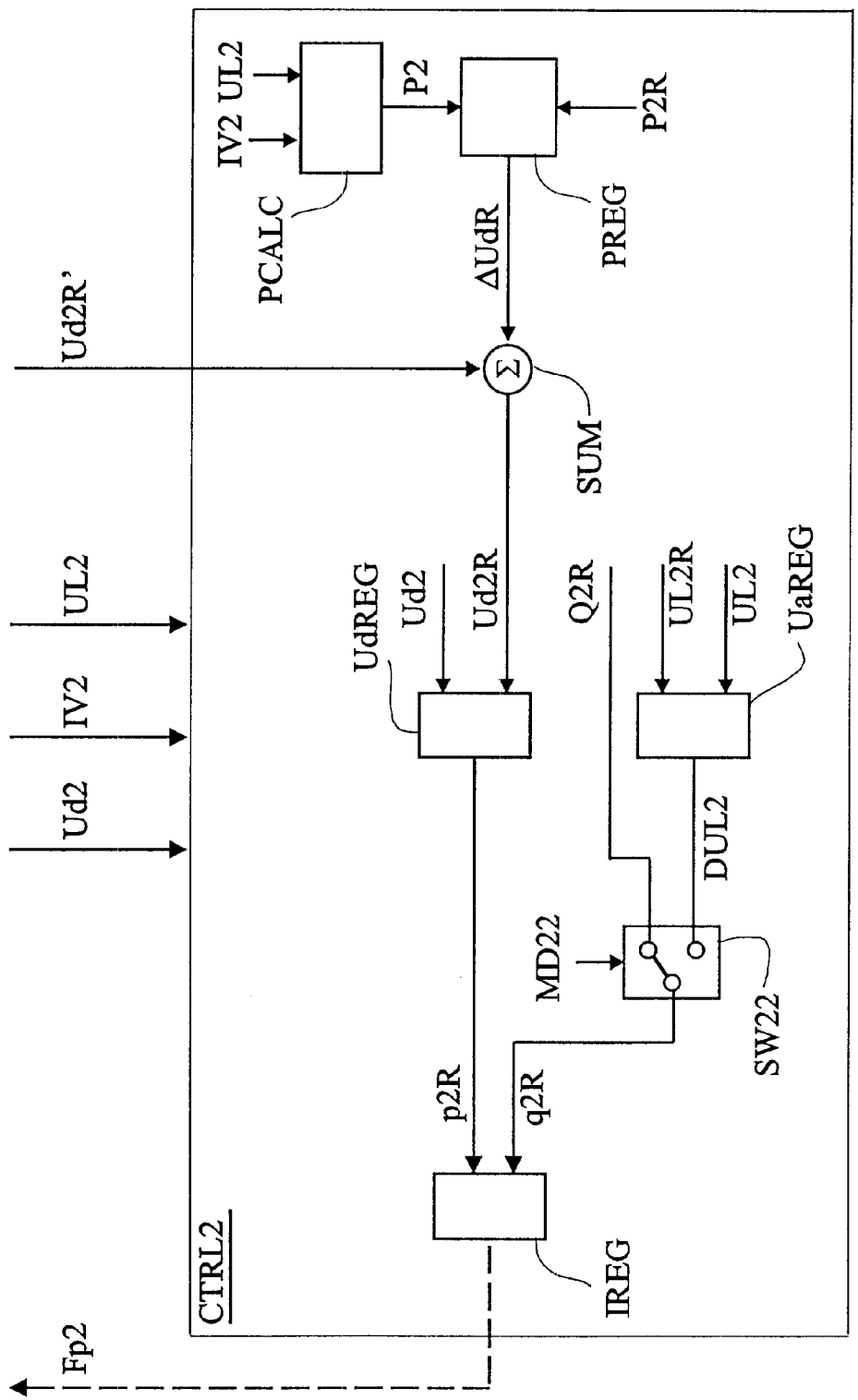
FIG. 3 shows in some detail a control equipment for a voltage source converter included in the system of FIG. 1, operating in active power control mode as known in the prior art.
Figure 4:
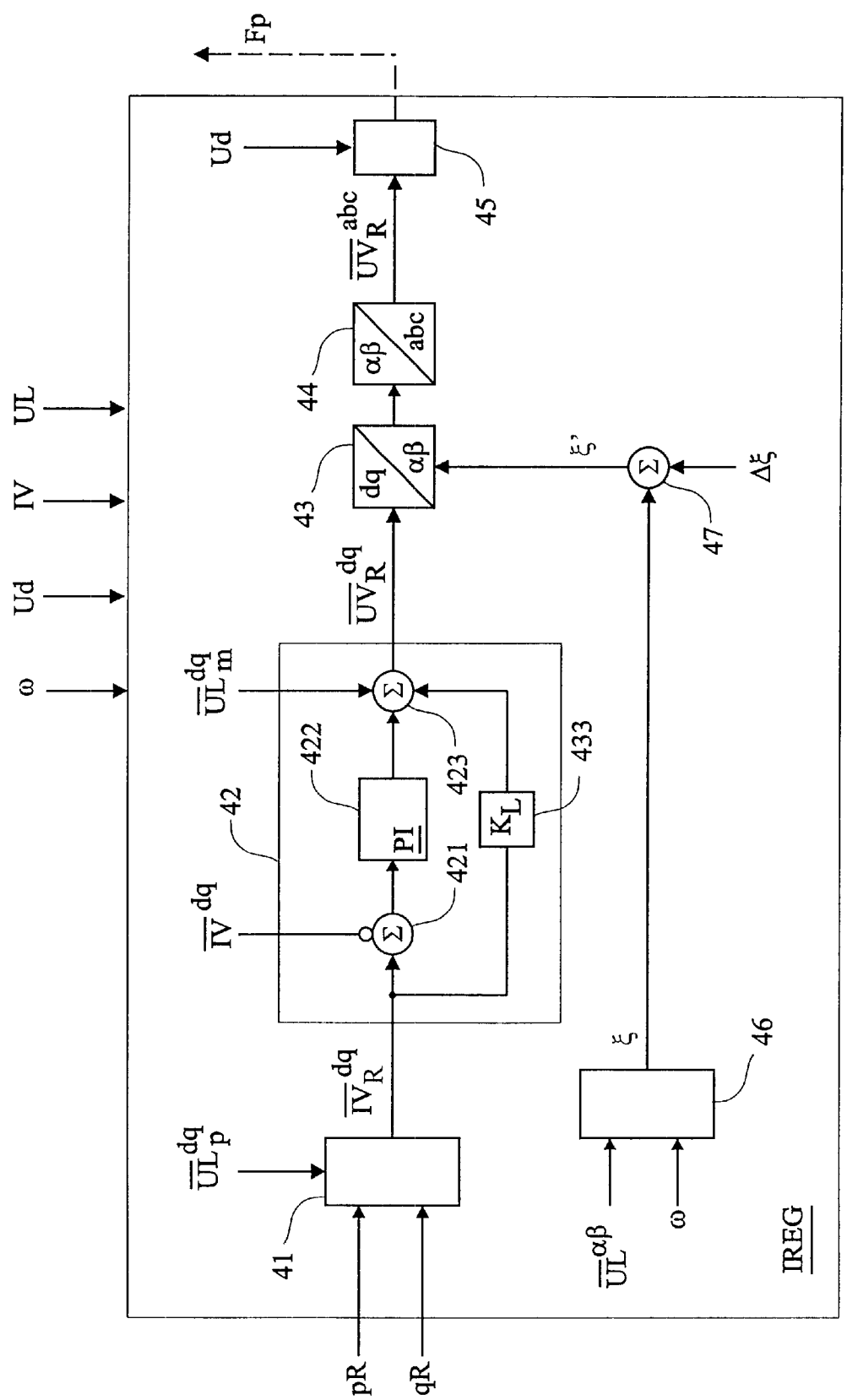
FIG. 4 shows in some detail the basic structure of a converter current control system for a voltage source converter included in the system of FIG. 1, as known in the prior art.

Thus, for example, the active power control system as described with reference to FIG. 3 may be replaced with other active power control system as known in the art.

The converter current control system may be implemented in other ways as known in the art. However, the person skilled in the art will with support from the description given above be able to implement possible modifications to the means for influencing the phase position of the bridge voltage, should such modifications then be required.

Figure 1:
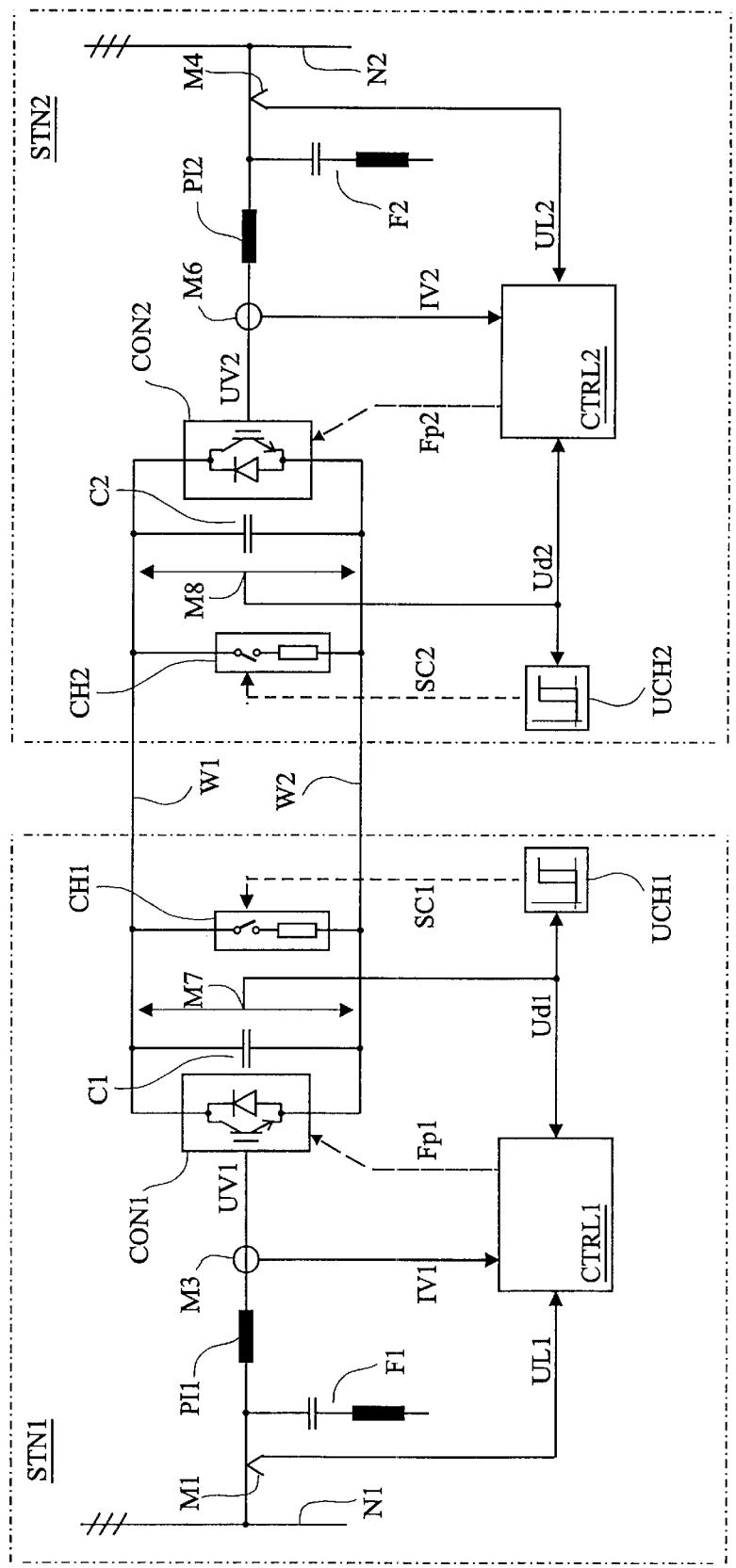
FIG. 1 shows a high voltage direct current transmission system as known in the prior art.
Figure 2:
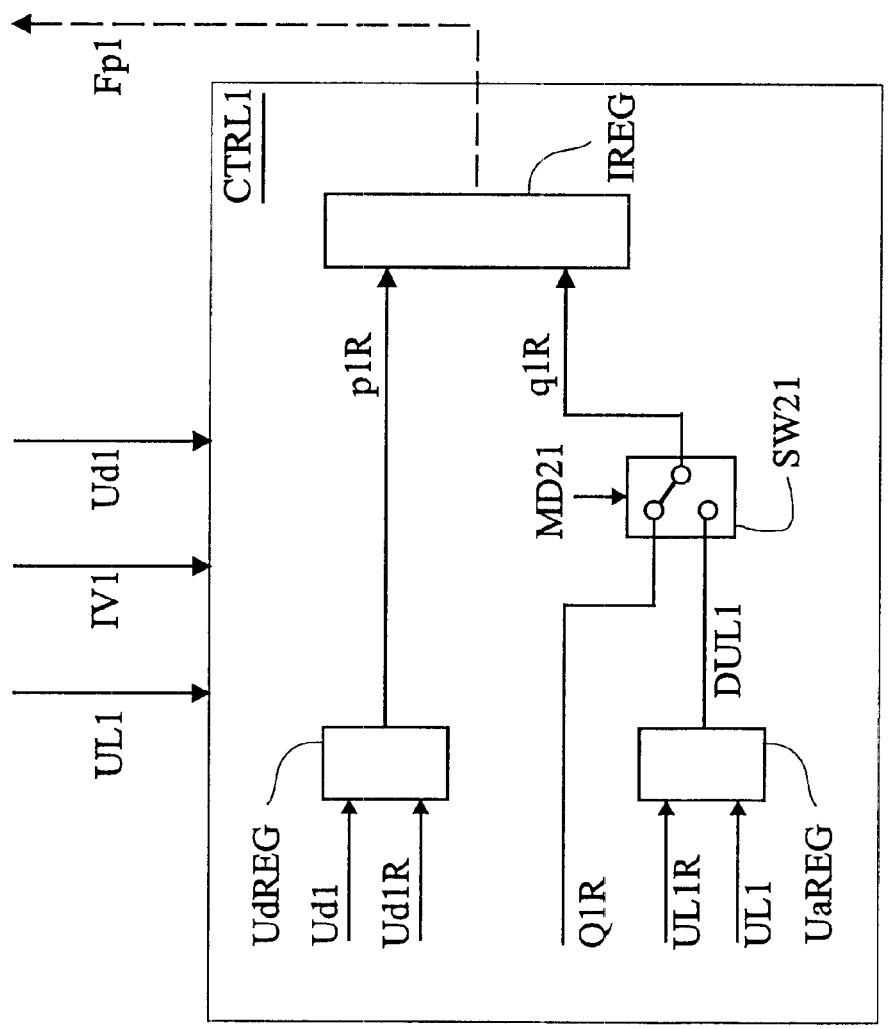
FIG. 2 shows in some detail a control equipment for a voltage source converter included in the system of FIG. 1, operating in dc-voltage control mode as known in the prior art.

The invention is also applicable to converter stations having other main circuit configurations of the voltage source converter than the one described in connection with FIG. 1, as well as to high voltage direct current transmission systems with the capacitor equipment having two parts and each part being coupled between a pole conductor and ground.

Although the bus voltage has been described as the voltage at the connection point of a filter equipment, it is obvious that also voltages sensed at other locations in the alternating current network can be used for synchronising purposes and for generation of the transformation angle.

Although the invention is described in connection with a two-terminal system, it is also applicable to multi-terminal transmission systems, where more than one converter station is coupled to the voltage controlling converter station to operate in active power control mode, as well as to back-to-back systems.

What is claimed is:

1. A control system (CTRL1, CTRL2) for a converter station (STN1, STN2) having a voltage source converter (CON1, CON2) coupled between a direct current link (W1, W2) and an alternating current network (N1, N2) in a high voltage direct current transmission system, the control system having means for control of active power flow (P) between the direct current link and the alternating current network by influencing the phase displacement ($\gamma$) between a bus voltage (UL1, UL2, UL) in the alternating current network and a bridge voltage (UV1, UV2, UV) of the voltage source converter, characterised in that the control system comprises detection means (48) for generation of a phase change order signal (PCO) in response to an indication of an abnormal voltage condition at the direct current link, and means (49) for influencing the phase position of the bridge voltage in response to said phase change order signal, so as to ensure that the phase displacement between the bridge voltage and the bus voltage will result in an active power flow from the direct current link to the alternating current network.

2. A control system as claimed in claim 1, characterised in that said means for influencing the phase position of the bridge voltage comprises means for adding a fixed phase contribution ($\Delta\delta$) to the phase position of the bridge voltage.

3. A control system as claimed in claim 1, characterised in that said detection means comprises means (481, 482, 483) for receiving a sensed value of the voltage (Ud) of the direct current link, and for generating said phase change order signal when the amplitude of said sensed value exceeds a first limit value and the rate of change with respect to time of said sensed value exceeds a second limit value.

4. A control system as claimed in claim 2, characterised in that said detection means comprises means (481, 482, 483) for receiving a sensed value of the voltage (Ud) of the direct current link, and for generating said phase change order signal when the amplitude of said sensed value exceeds a first limit value and the rate of change with respect to time of said sensed value exceeds a second limit value.

5. A control system as claimed in claim 1, characterised in that the control system further comprises:
   detection means (485, 486) for generation of the phase change order signal in response to an indication that the bridge voltage has lost its synchronism with the bus voltage.

6. A control system as claimed in claim 4, characterised in that the control system further comprises:
   detection means (485, 486) for generation of the phase change order signal in response to an indication that the bridge voltage has lost its synchronism with the bus voltage.

7. A control system as claimed in claim 5, wherein the control system generates a reference value ($IV_R^d$) for the active power component of the alternating current (IV1, IV2, IV) at the converter, characterised in that said detection means comprises means (485) for receiving that reference value and a sensed value ($IV^d$) representative of the active power component of the alternating current at the converter, and for generating said phase change order signal when a difference of said sensed value representative of the active power component of the alternating current at the converter and the reference value exceeds a third limit value.

8. A control system as claimed in claim 6, wherein the control system generates a reference value ($IV_R^d$) for the active power component of the alternating current (IV1, IV2, IV) at the converter, characterised in that said detection means comprises means (485) for receiving that reference value and a sensed value ($IV^d$) representative of the active power component of the alternating current at the converter, and for generating said phase change order signal when a difference of said sensed value representative of the active power component of the alternating current at the converter and the reference value exceeds a third limit value.

9. A control system as claimed in claim 1, having a current control system (IREG) that generates a reference value ($\overline{UV}_R^{abc}$) for the bridge voltage in dependence on a synchronising signal ($\xi$) indicative of the phase position of the bus voltage, characterised in that said means for influencing the phase position of the bridge voltage in dependence on said phase change order signal comprises means (47) for receiving the synchronising signal, and for adding thereto said fixed phase contribution in dependence on said phase change order signal.

10. A control system as claimed in claim 8, having a current control system (IREG) that generates a reference value ($\overline{UV}_R^{abc}$) for the bridge voltage in dependence on a synchronising signal ($\xi$) indicative of the phase position of the bus voltage, characterised in that said means for influencing the phase position of the bridge voltage in dependence on said phase change order signal comprises means (47) for receiving the synchronising signal, and for adding thereto said fixed phase contribution in dependence on said phase change order signal.

11. A control system as claimed in claim 9, wherein the alternating current network is a three-phase system (abc-system) and the current control system is operating in a rotating two-axis reference plane (dq-reference plane), the current control system comprising transformation means (43, 44) for transformation of the reference value ($\overline{UV}_R^{dq}$) for the bridge voltage from the rotating two-axis reference plane to the three-phase system in dependence on a transformation angle ($\xi'$), characterised in that said means for influencing the phase position of the bridge voltage in dependence on said phase change order signal real comprises means (47) for receiving the synchronising signal and said fixed phase contribution, and forming the transformation angle in dependence on a sum thereof.

12. A control system as claimed in claim 10, wherein the alternating current network is a three-phase system (abc-system) and the current control system is operating in a rotating two-axis reference plane (dq-reference plane), the current control system comprising transformation means (43, 44) for transformation of the reference value ($\overline{UV}_R^{dq}$) for the bridge voltage from the rotating two-axis reference plane to the three-phase system in dependence on a transformation angle ($\xi'$), characterised in that said means for influencing the phase position of the bridge voltage in dependence on said phase change order signal comprises means (47) for receiving the synchronising signal and said fixed phase contribution, and forming the transformation angle in dependence on a sum thereof.

13. Method for control of a converter station (STN1, STN2), using a converter station having a voltage source converter (CON1, CON2) coupled between a direct current link (W1, W2) and an alternating current network (N1, N2) in a high voltage direct current transmission system, the control system having means for control of active power flow (P) between the direct current link and the alternating current network by influencing the phase displacement ($\gamma$) between a bus voltage (UL1, UL2, UL) in the alternating current network and a bridge voltage (UV1, UV2, UV) of the voltage source converter, characterised in that the method comprises the steps of:
   generating of a phase change order signal (PCO) in response to an indication of an abnormal voltage condition at the direct current link, and
   influencing the phase position of the bridge voltage in response to said phase change order signal, so as to ensure that the phase displacement between the bridge voltage and the bus voltage will result in an active power flow from the direct current link to the alternating current network.

14. A method as claimed in claim 13, characterised in that said step of influencing the phase position of the bridge voltage comprises the step of adding a fixed phase contribution ($\Delta\delta$) to the phase position of the bridge voltage.

15. A method as claimed in claim 13, characterised in that said step of generating a phase change order signal comprises the step of receiving a sensed value of the voltage (Ud) of the direct current link, and generating said phase change order signal when the amplitude of said sensed value exceeds a first limit value and the rate of change with respect to time of said sensed value exceeds a second limit value.

16. A method as claimed in claim 14, characterised in that said step of generating a phase change order signal comprises the step of receiving a sensed value of the voltage (Ud) of the direct current link, and generating said phase change order signal when the amplitude of said sensed value exceeds a first limit value and the rate of change with respect to time of said sensed value exceeds a second limit value.

17. A method as claimed in claim 13, characterised in that said step of generating of a phase change order signal comprises the step of generating the phase change order signal in response to an indication that the bridge voltage has lost its synchronism with the bus voltage.

18. A method as claimed in claim 16, characterised in that said step of generating of a phase change order signal comprises the step of generating the phase change order signal in response to an indication that the bridge voltage has lost its synchronism with the bus voltage.

19. A method as claimed in claim 17, wherein the control system generates a reference value ($IV_R^d$) for the active power component of the alternating current (IV1, IV2, IV) at the converter, characterised in that said step of generating a phase change order signal comprises the steps of receiving that reference value and a sensed value ($IV^d$) representative of the active power component of the alternating current at the converter, and generating said phase change order signal when a difference of said sensed value representative of the active power component of the alternating current at the converter and the reference value exceeds a third limit value.

20. A method as claimed in claim 18, wherein the control system generates a reference value ($IV_R^d$) for the active power component of the alternating current (IV1, IV2, IV) at the converter, characterised in that said step of generating a phase change order signal comprises the steps of receiving that reference value and a sensed value ($IV^d$) representative of the active power component of the alternating current at the converter, and generating said phase change order signal when a difference of said sensed value representative of the active power component of the alternating current at the converter and the reference value exceeds a third limit value.

21. A method as claimed in claim 13, wherein the control system has a current control system (IREG) that generates a reference value ($\overline{UV}_R^{abc}$) for the bridge voltage in dependence on a synchronising signal ($\xi$) indicative of the phase position of the bus voltage, characterised in that said step of influencing the phase position of the bridge voltage comprises the steps of receiving the synchronising signal, and adding thereto said fixed phase contribution in dependence on said phase change order.

22. A method as claimed in claim 20, wherein the control system has a current control system (IREG) that generates a reference value ($\overline{UV}_R^{abc}$) for the bridge voltage in dependence on a synchronising signal ($\xi$) indicative of the phase position of the bus voltage, characterised in that said step of influencing the phase position of the bridge voltage comprises the steps of receiving the synchronising signal, and adding thereto said fixed phase contribution in dependence on said phase change order.

23. A method as claimed in claim 21, wherein the alternating current network is a three-phase system (abc-system) and the current control system is operating in a rotating two-axis reference plane (dq-reference plane), the current control system comprising transformation means (43, 44) for transformation of the reference value ($\overline{UV}_R^{dq}$) for the bridge voltage from the rotating two-axis reference plane to the three-phase system in dependence on a transformation angle ($\xi'$), characterised in that said step of influencing the phase position of the bridge voltage comprises the steps of receiving the synchronising signal and said fixed phase contribution, and forming the transformation angle in dependence on a sum thereof.

24. A method as claimed in claim 22, wherein the alternating current network is a three-phase system (abc-system) and the current control system is operating in a rotating two-axis reference plane (dq-reference plane), the current control system comprising transformation means (43, 44) for transformation of the reference value ($\overline{UV}_R^{dq}$) for the bridge voltage from the rotating two-axis reference plane to the three-phase system in dependence on a transformation angle ($\xi'$), characterised in that said step of influencing the phase position of the bridge voltage comprises the steps of receiving the synchronising signal and said fixed phase contribution, and forming the transformation angle in dependence on a sum thereof.

* * * * *

UNITED STATES PATENT AND TRADEMARK OFFICE
CERTIFICATE OF CORRECTION

PATENT NO. : 6,400,585 B2  Page 1 of 1
DATED : June 4, 2002
INVENTOR(S) : Jiang-Hafner It is certified that error appears in the above-identified patent and that said Letters Patent is hereby corrected as shown below:

<u>Title page,</u>
Item [30], Foreign Application Priority Data should read:

--      [30]      Foreign Application Priority Data
        Jun. 2, 2000     (EP) ……………………..………….. 00201949 --

Signed and Sealed this

Third Day of December, 2002

JAMES E. ROGAN
*Director of the United States Patent and Trademark Office*